United States Patent [19]
O'Brien et al.

[11] Patent Number: 5,881,132
[45] Date of Patent: Mar. 9, 1999

[54] METHOD AND APPARATUS FOR MONITORING SELECTED TELECOMMUNICATIONS SESSIONS IN AN INTELLIGENT SWITCHED TELEPHONE NETWORK

[75] Inventors: William G. O'Brien; Thomas C. Charlton, both of Orleans; L. Lloyd Williams, Kanata; Robert S. Jones, Winchester, all of Canada

[73] Assignee: Bell Canada, Montreal, Canada

[21] Appl. No.: 886,471

[22] Filed: Jul. 1, 1997

[51] Int. Cl.[6] .............................. H04M 1/24; H04M 7/00
[52] U.S. Cl. ................................. 379/35; 379/230
[58] Field of Search ................... 379/7, 34, 35, 379/219, 220, 221, 229, 230

[56] References Cited

U.S. PATENT DOCUMENTS

| | | | |
|---|---|---|---|
| 4,815,120 | 3/1989 | Kosich | 379/34 |
| 5,351,287 | 9/1994 | Bhattacharyya et al. | 379/35 |
| 5,377,186 | 12/1994 | Wegner et al. | 370/62 |
| 5,586,177 | 12/1996 | Farris et al. | 379/230 |
| 5,590,171 | 12/1996 | Howe et al. | 379/33 |
| 5,606,604 | 2/1997 | Rosenblatt et al. | 379/35 |
| 5,757,889 | 5/1998 | Ohtake | 379/35 |

*Primary Examiner*—Paul Loomis
*Attorney, Agent, or Firm*—Foley & Lardner

[57] ABSTRACT

A method, system and apparatus for the transparent monitoring of selected telecommunications sessions in an intelligent switched telephone network is described. The method involves conditioning the network to enable the monitoring of all telecommunications sessions originating from or terminating to any selected subscriber address. The network is conditioned by the installation of monitored trunks with translation tables, linksets and routesets which route all calls to be monitored through the monitored trunk groups. After the network has been conditioned, call monitoring can be accomplished with minimal datafill changes to the translation tables of the telephone switching system that serves the subscriber address. The monitored trunk groups are preferably loop-back trunk groups, but they may be dedicated inter-office trunk groups as well. It is also possible to designate a central switching point to monitor calls for a plurality of satellite switching points. The advantage is a flexible, cost-effective call monitoring system that produces no echo, ping or noise on the monitored line. The calls are completed without perceptible delay and there is no known method or equipment for detecting the monitoring equipment from either end of the call connection.

17 Claims, 9 Drawing Sheets

METHOD AND APPARATUS FOR MONITORING SELECTED TELECOMMUNICATIONS SESSIONS IN AN INTELLIGENT SWITCHED TELEPHONE NETWORK

TECHNICAL FIELD

This invention generally relates to telecommunications systems, and more particularly to a method and apparatus for monitoring selected telecommunications sessions in an intelligent switched telephone network.

BACKGROUND OF THE INVENTION

Since the invention of the telephone and the pervasive use of telecommunications for exchanging information and conducting business, there has been a recognized need by private industry and government authorities for an ability to monitor selected telecommunications sessions.

Private industry routinely monitors selected telecommunications sessions, in particular voice communications, to evaluate the effectiveness of sales and customer service personnel to ensure that clients and/or potential clients receive adequate and courteous service in an attempt to maintain and increase market share. Because so many business transactions are now conducted by telephone, it is imperative that commercial operations have the ability to monitor their staff in an unobtrusive and undetectable fashion in order to ensure that an accurate evaluation of attitude and performance is obtained.

Selective monitoring of telecommunications is also conducted by government agencies, in particular law enforcement agencies in order to acquire information important in the maintenance of law and order. Since sophisticated tools are commercially available to permit the detection of monitoring equipment, law enforcement agencies require monitoring facilities which are difficult or impossible to detect in order to ensure that acquired information is accurate and reflective of information that would be exchanged in confidentiality.

A great deal of inventive ingenuity has been directed to providing systems for monitoring telecommunications sessions. Generally, prior art systems require that a "tap" consisting of a mechanical connection or bridge to monitoring equipment be attached to the telephone line to be monitored. This act of mechanically "tapping" into the monitored line is generally accomplished at a local telephone switch within the public switched telephone network or in a private branch exchange. A disadvantage of such monitoring equipment is that it changes the impedance on the monitored line and is readily detectable. Another disadvantage is that a great deal of time and effort is required to install such a monitoring connection. There is also a significant disadvantage for business in the lack of flexibility in this solution because the monitoring equipment is not readily switched from line to line. If, for example, a company wishes to monitor several sales persons randomly or sequentially, a prior art tap must be connected to each line used by the sales persons or the tap must be laboriously moved from line to line. The problem is further exacerbated if the sales persons use mobile equipment or have a Personal Number Service (PNS). In those instances, there is no practical solution for monitoring telecommunications sessions using such prior art equipment.

An automated and more flexible solution to communications monitoring is provided in U.S. Pat. No. 5,590,171 which issued to Howe et al on Dec. 31st, 1996. Howe et al provide a method and apparatus for allowing a communication from a calling party to a called party to be monitored and/or recorded by a monitoring party. The telephone switching system is equipped with Advanced Intelligent Network (AIN) capability which permits software triggers in the service switching points (SSPs) to respond to AIN triggers when a call is dialled to or from a designated line served by the network. The AIN trigger generates an appropriate message to be sent out over the Advanced Intelligent Network and suspends call handling until the SSP receives a reply from the network instructing the SSP to take certain action. If the SSP receives instructions to monitor the call, the SSP completes the call from the calling to the called party and then constructs a bridge to monitoring equipment which establishes a one-way line to a monitoring person or recording equipment such as a tape-recorder.

While this solution to the problem overcomes many disadvantages of the prior art, it too suffers from certain disadvantages. First, the query to a central AIN database for call routing instructions generally takes a minimum of 600 milliseconds. This introduces a perceptible delay in the call process which may be detected by the calling party. Second, because the bridge to the monitoring equipment is not constructed until the calling and the called party are connected, connection of the bridge can sometimes be audibly detected. A significant motivation for monitoring is defeated if the monitored employee is able to detect when their conversation is being monitored. Of course, any method of call monitoring is of substantially no value to law enforcement officials if either of the called or the calling parties is in any way able to detect the fact that the call is being monitored.

SUMMARY OF THE INVENTION

It is an object of the present invention to provide a method for monitoring selected telecommunications sessions on an intelligent switched telephone network which permits any call made to or from a designated subscriber address to be monitored.

It is another object of the invention to provide a method for monitoring selected telecommunications sessions which permits a monitored telephone call request to be connected without appreciable delay.

It is a further object of the invention to provide a network architecture for monitoring telecommunications sessions which is undetectable by known electronic analyzers designed to detect the presence of monitoring equipment on a telephone line.

It is yet a further object of the invention to provide a network architecture for monitoring selected telecommunications sessions which does not introduce noise, ping or echo in a voice communications path.

It is yet another object of the invention to provide a network architecture for monitoring selected telecommunications sessions in an intelligent switched telephone network which is relatively inexpensive to construct, implement and maintain.

In a preferred implementation, the invention provides a method of monitoring selected telecommunications sessions in an intelligent switched telephone network wherein a subscriber address served by the network is designated as an address to be monitored, comprising the steps of:

a) routing all originating and all terminating call requests for the subscriber address through a monitored trunk in the network; and b) otherwise, handling the calls as any other call request of the same class.

The invention also provides a system in an intelligent switched telephone network and an apparatus adapted to provide transparent, efficient call monitoring for any subscriber address served by the network. Monitoring may be accomplished for any subscriber including wireless communications, satellite, Personal Communications Service (PCS), pagers, cellular and Personal Number Service (PNS) subscribers. In accordance with the preferred embodiment of the invention, the telephone switch in the network which serves the address to be monitored and the switch equipped with the monitoring equipment, if it is different from the serving switch, are conditioned to monitor calls. The conditioning is accomplished by setting up initial translation tables, routesets and monitored trunk groups in the network. After the network is conditioned, the monitoring of telecommunications sessions can be accomplished with minimal datafill changes in the translation tables of the switch(es) so that all inbound and outbound calls to the subscriber address to be monitored are routed through a monitored trunk.

The invention may be implemented in an intelligent switched telephone network in a number of ways. The way in which the invention is implemented is immaterial so long as call processing can be accomplished in real time with negligible delay in the call setup process.

The monitored trunks over which telecommunications sessions to be monitored are routed may be loop-back trunks, or dedicated inter-office trunks. The loop-back trunk (s) are preferably installed on each intelligent (ISUP enabled) switching point (SP) in the network. Alternatively, loop-back trunks may be installed on only selected central SP(s) in the network and calls originating from or terminating to satellite SP(s) in the network are routed to the central SP for monitoring before they are completed. This is referred to as a "clustered" architecture. As a second alternative, call monitoring may be accomplished using dedicated inter-office monitored trunks. Using this network architecture, calls to be monitored are routed over a trunk member of the dedicated inter-office trunk group(s) before they are completed. Monitoring equipment is commercially available to permit any channel of a trunk group to be monitored, and any number of the channels may be monitored concurrently. The monitoring equipment is connected using a high-impedance and/or a digital bridge. Since the monitoring equipment is bridged to a trunk through which the call is routed and there is no direct bridging to the subscriber line or in the calling switch, detection of the monitoring equipment is impossible using methods and/or electronic analyzers known to the applicant.

This method of arranging monitoring equipment also eliminates ping, echo and perceptible call setup delay so that both the calling and the called party are unaware of call monitoring. Thus, monitoring of employees for performance and/or effectiveness can be accomplished without their knowledge of when monitoring occurs, which permits accurate evaluations to be made. In addition, one skilled in the art of switch translations can enable or disable call monitoring on a conditioned SP using remote facilities in a matter of minutes, thus enabling a flexible cost-effective solution for call monitoring in an intelligent switched telephone network.

In a further aspect of the invention, a novel apparatus is described which facilitates the economic implementation of each of the three preferred network architectures for the call monitoring system in accordance with the invention. The novel apparatus is a high-speed processor provided with a CCS interface. The apparatus is called a Virtual Administrative Signalling Point (VASP) and is preferably logically configured in the network as a STP, although it also functions like a virtual SP in its role as a node in a network architecture in accordance with the invention.

Any of the three preferred network architectures in accordance with the invention can also be implemented using an ISTP described in U.S. Pat. No. 5,586,177, or an SP equipped to accommodate more than one ISUP point code.

In a preferred embodiment of the invention, a Call Detail Record (CDR) is provided for each monitored call by capturing and duplicating CCS ISUP call control messages relating to the call. The call data may be extracted from the ISUP messages by a VASP, ISTP, SS7 link monitor, or SPs in the network enabled for that function.

DESCRIPTION OF THE PREFERRED
EMBODIMENTS OF THE INVENTION

In general terms, the invention relates to a method of monitoring selected telecommunications sessions in an intelligent switched telephone network where a subscriber address served by the network is designated as an address to be monitored and all calls originating from and terminating to the designated address are routed through a monitored trunk in the network. Otherwise, calls to and from the designated address are routed through the intelligent switched telephone network as any other call request of the same class of service.

This method has the advantage of making the monitoring apparatus undetectable by methods or equipment currently known to be used for such purpose. The method may be implemented in a number of ways but is preferably implemented in such a manner that no perceptible delay is introduced into the call setup process.

The implementation of the invention in an intelligent switched telephone network also preferably provides a mechanism for capturing information about a monitored call from Common Channel Signaling (CCS) messages exchanged in the network to control the call. Preferably, all CCS messages relating to every monitored call are captured and the captured messages are passed through a software filter to provide a Call Detail Record (CDR) tailored to the requirements of the call monitoring party.

NETWORK ARCHITECTURE

Figure 1A:
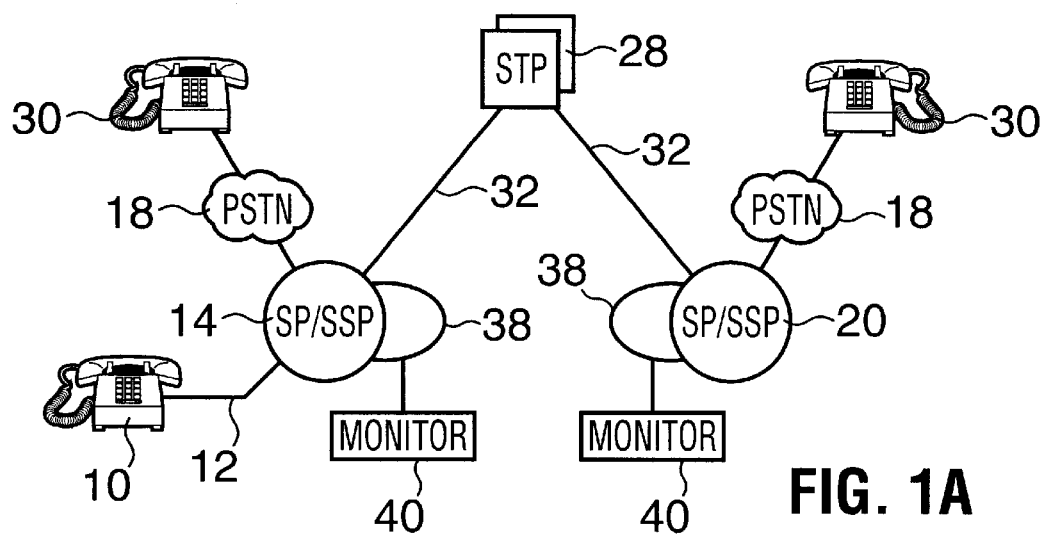
FIGS. 1A–1C are schematic diagrams of preferred trunking arrangements for the monitoring trunks utilized in the monitoring system in accordance with the invention.
Figure 1B:
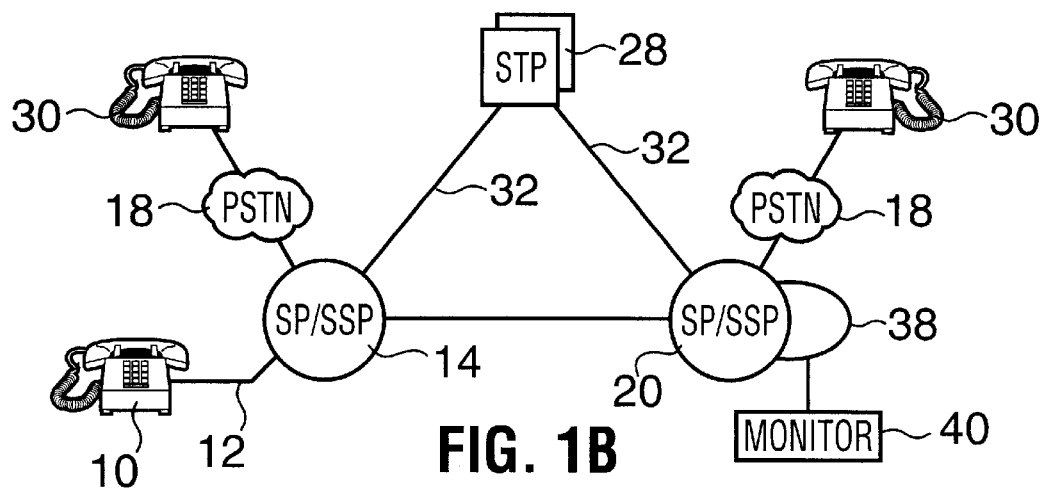
Figure 1C:
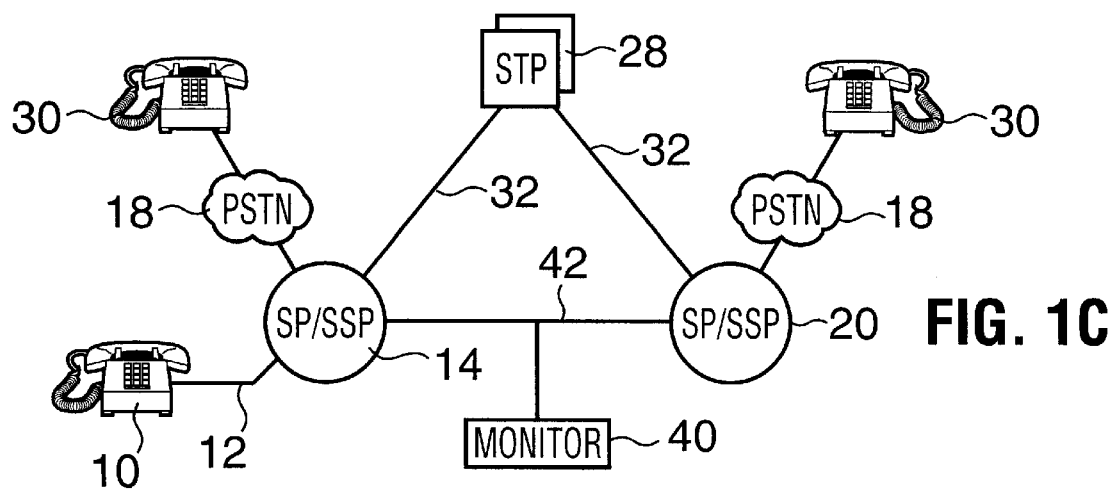

FIGS. 1A–1C are schematic diagrams of a portion of an intelligent switched telephone network configured with trunks and monitoring equipment to enable a monitoring system in accordance with the invention.

FIG. 1A shows a subscriber telephone 10 connected by a subscriber line 12 to a switching point 14 (hereinafter referred to as a SP). The SP 14 may be any one of a number of switches capable of serving as switches in an intelligent switched telephone network. Each SP is at least equipped with a common channel signaling interface and is capable of generating, sending, and receiving Integrated Services Digital Network User Part (ISUP) Common Channel Signaling (CCS) messages. For the purposes of this document, SP designates a network switching point as well as a network Service Switching Point (SSP) which is generally equipped with Transaction Capabilities Application Part (TCAP) capability as well as ISUP capability. The SP 14 has a line side to which the subscriber line 12 is connected and a trunk side to which a plurality of trunks (not illustrated) connect the SP 14 to other SPs in the network. For the purposes of clarity, only one other switching point in the intelligent switched telephone network is illustrated, an SP 20. Each SP 14, 20 is connected to the Public Switched Telephone Network (PSTN) 18 in a manner well known in the art. The PSTN in turn includes a plurality of SPs which service a plurality of subscribers.

As is well known in the art, the intelligent switched telephone network includes a common channel signalling (CCS) network used for passing call control and other signaling messages between nodes in the network, such as the SPs 14 and 20. In order to conserve signaling links, the signaling network includes Signal Transfer Points (STPs) which for the purpose of reliability are arranged in redundant or "mated" pairs. In the simplified network configuration depicted, a mated pair of STPs 28 are illustrated. Each STP in the pair is interconnected in a manner well known in the art by signaling links 32 with each SP 14 and 20.

The monitoring system in accordance with the invention adds elements to the intelligent switched telephone network shown in FIG. 1A. Those elements include loop-back trunks 38 which are preferably connected to each of SPs 14 and 20, and telecommunications monitoring equipment 40 connected to each loop-back trunk. The loop-back trunks 38 are preferably ISUP trunks carried on DS1 or E1 trunk facilities which respectively accommodate 24 and 30 voice channels. In the loop-back arrangement, the odd-numbered trunk members are preferably equipped for outbound calls and the even-numbered trunk members are preferably equipped for inbound calls. The trunk members equipped for outbound calls and the trunk members equipped for inbound calls are interconnected in a predefined relationship at a patch panel or the like to form a loop in a manner well known in the art. Monitoring equipment 40 is connected to each of the loop-back trunks 38. Monitoring equipment is commercially available which permits any of the channels of each trunk facility to be independently and concurrently monitored. Such monitoring equipment is well known in the art and is available, for example, from JSI Data Systems Ltd., Nepean, Ontario, Canada. Use of the loop-back trunks 38 and the monitoring equipment 40 to monitor all calls originating from or terminating to a designated subscriber address will be described in detail below.

FIG. 1B shows essentially the same configuration of the network as shown in FIG. 1A with the exception that the loop-back trunks 38 for call monitoring are provided on only SP 20 in what will be referred to hereinafter as a "clustered" architecture. All network elements are the same as described above with reference to FIG. 1A with the exception that the loop-back trunks 38 for call monitoring are provided only at SP 20 and all calls originating from or terminating to the subscriber line 12 are routed to the SP 20 and subsequently through the loop-back trunks 38. This arrangement is designed to economically accommodate a situation in which the demand for call monitoring is assumed to be moderate and one SP in a given geographical area has surplus capacity which can be allocated to the switching requirements for the call monitoring process. While this configuration conserves the number of loop-back trunks 38 required in the network and the number of monitoring equipment 40 installations, it uses extra inter-office trunk capacity in the network, as will be apparent from the description which follows.

FIG. 1C shows yet a further preferred configuration of the intelligent switched telephone network to accommodate the monitoring system in accordance with the invention. All network elements shown in FIG. 1C are the same as those shown in FIGS. 1A and 1B with the exception that the loop-back trunks 38 are replaced by dedicated inter-office trunks 42 which, for example, interconnect SPs 14 and 20. The dedicated inter-office trunks 42 may be existing surplus trunk capacity allocated to the call monitoring system in accordance with the invention. If surplus inter-office trunk capacity does not exist, an inter-office trunk facility may be added to the network for that purpose. The monitoring equipment 40 is connected to the inter-office trunks 42 in the same manner as described above. It is preferred that the inter-office trunks 42 be dedicated to exclusive use by the monitoring system in order to ensure that calls to undesignated addresses are not monitored and further to ensure that capacity exists for monitoring all calls originating from or terminating to a designated subscriber address. It is not essential, however, that dedicated trunk facilities be used.

NETWORK CONDITIONING

As will be understood by those skilled in the art, after the monitored loop-back trunks 38 or the dedicated inter-office trunks 42 are added to the intelligent switched telephone network, the network must be still further "conditioned" to enable call monitoring in accordance with the invention. That conditioning involves constructing translation tables, routesets and link sets compatible with the network architecture selected for call monitoring to ensure that all calls to or from a designated subscriber address are routed to the monitored trunk groups 38, 42. Once network conditioning is completed, voice monitoring can be accomplished with minimal datafill changes in the SP which serves the subscriber address designated to be monitored and the switch (es) to which the monitored trunk group(s) are attached, if they are not the same. The monitoring system in accordance with the invention is completely integrated into the intelligent switched telephone network and uses electronic switching, common channel signaling and advanced services which make up the existing intelligent switched telephone network. Consequently, the call monitoring system in accordance with the invention is completely transparent to any telephone user.

ROUTING TRANSLATIONS

A principal component of the network conditioning required to enable the call monitoring system in accordance with the invention is certain changes to the routing translations in the SPs of the intelligent switched telephone network in which the system is to be enabled. Although only standard translation methods and standard translation tables are used to implement the monitoring system in accordance with the invention, the translation strategy is adequately inventive to warrant a general description of how SP translation tables are modified to ensure that all inbound and outbound calls to a designated subscriber address are monitored.

The public switched telephone network (PSTN) consists of a voice connection over inter-office trunks set up using signaling messages exchanged over the CCS system, which is typically a Signaling System 7 (CCS7) common channel signaling system. The trunk groups used for any call are determined by routing translations stored in the memory of each SP and a class of service assigned to each subscriber line. The class of service designates the type of subscriber line. For example, there are classes of service for residential, two-party line, Centrex, ISDN and business classes of service. In addition to a class of service, each subscriber line is also assigned a line treatment group. The line treatment group is a numeric value that is used when customers of the same class of service require different routing options. For example, a line treatment group may be used for applications such as selective call blocking, facsimile routing or 911 call routing when a switch serves two different calling regions.

For the call monitoring system in accordance with the invention, unique line treatment groups are created to be used exclusively for call monitoring, as will be explained in more detail below.

Routing translations are used to select a trunk group that will carry a call. Routing translations also determine the number of digits that will be forwarded to the terminating SP. The organization and naming of routing translation tables is proprietary to different switch manufacturers but all switches operate in essentially the same way. The description which follows is therefore generic but applicable by those skilled in the art to any modern intelligent switching system. The translation table most commonly used for routing translations is the standard pretranslator. The standard pretranslator is set up to route calls to specific trunk routes based on the digits dialled. The standard pretranslator can be configured to examine from 1 to 18 of the digits dialled to determine the trunk route which will be used for any call.

OUTBOUND CALL TREATMENT

Figure 2:
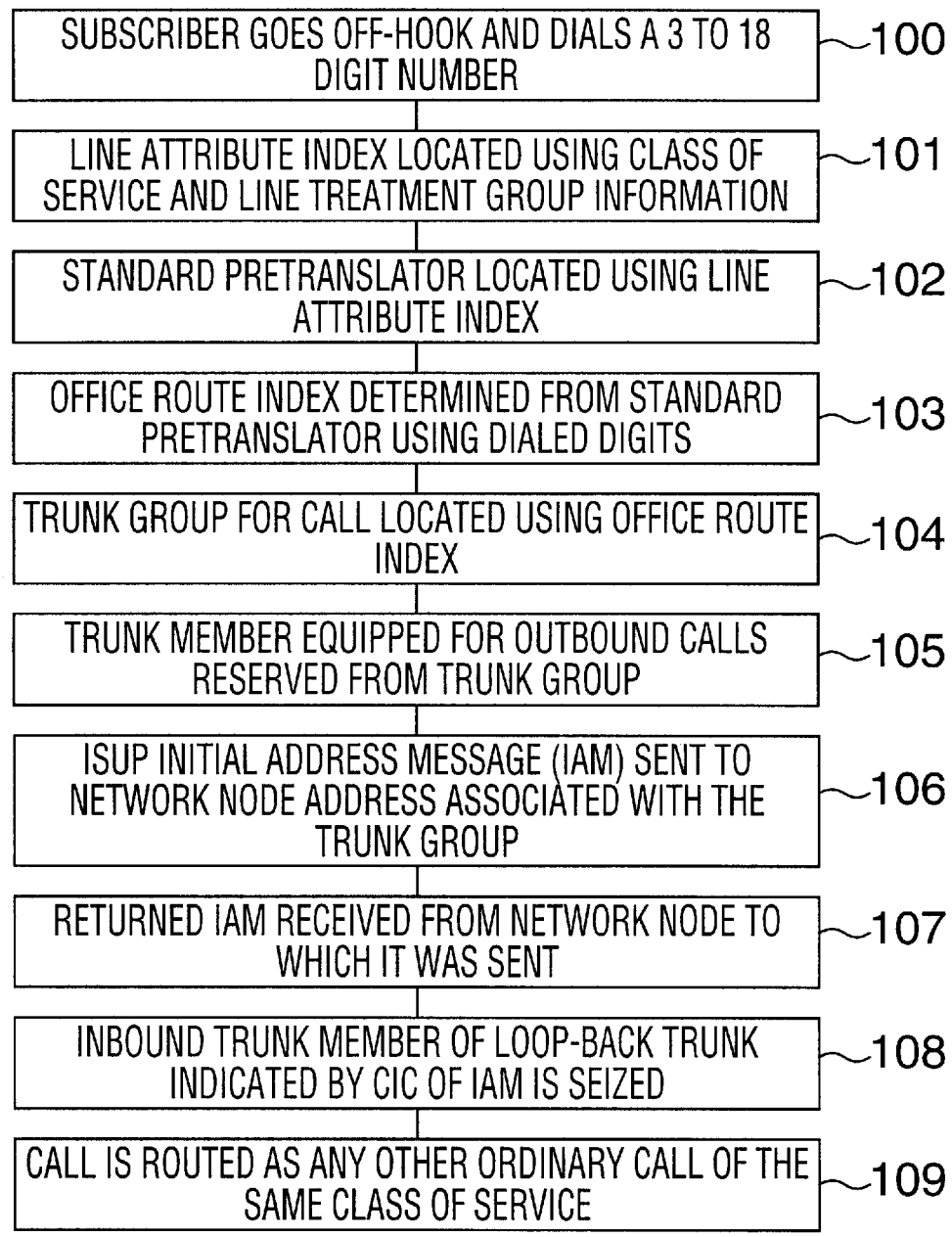
FIG. 2 is a block diagram showing the progression of an outbound call from a network address to be monitored using the monitoring system in accordance with the invention.

FIG. 2 shows a block diagram of a treatment of an outbound call originating from a subscriber address designated as an address to be monitored. As a first step in the call process, the subscriber goes off-hook and dials 3 to 18 digits in step 100 to initiate an outbound call. Assuming the subscriber is served by the SP 14, for example, the SP 14 (see FIGS. 1A–1C) detects the off-hook condition and collects the dialled digits. Using the class of service and line treatment group information related to the subscriber line 12, the SP 14 in step 101 locates a line attribute index for the subscriber line 12. The subscriber line attribute index located in step 101 is used in step 102 to select a standard pretranslator to be used for the call. After the standard pretranslator is located, the dialled digits are used to determine the office route index found in the standard pretranslator in step 103. The trunk group for the call is then located in step 104 using the office route index. In the case of the standard pretranslator for a monitored subscriber line, the office route index in all cases points to a trunk equipped for outbound calls used for call monitoring, such as the loop-back trunks 38 (see FIG. 1A), for example. Therefore, in step 104 the standard pretranslator forces the call onto the outbound portion of the loop-back trunks 38. In step 105, the SP 14 reserves a trunk member equipped for outbound calls in the outbound portion of the loop-back trunks 38.

In conditioning the SP 14 in accordance with the invention, a new line attribute index and a new standard pretranslator are defined for every local calling area served by the SP 14. These new line attribute indexes are associated with line treatment groups used exclusively for the voice monitoring system. Whenever a subscriber is assigned the line treatment group, any call originating from the subscriber line will be routed, for example, to the loop-back monitoring trunks 38. The subscriber's line treatment group can be changed via the normal service order routine currently used in the PSTN. A one-line script can be used to dynamically change the subscriber's line treatment group, thereby. facilitating voice monitoring. When an outbound trunk member associated with a monitored trunk group, loop-back trunks 38 for example, is selected, the SP 14 is directed by an ISUP Destination Table to the linkset and routeset for the monitored trunk group. The linkset and routeset depend on the network architecture selected to implement the invention as will be explained below in detail. In step 106, the SP 14 therefore sends an ISUP Initial Address Message (IAM) using the linkset and routeset datafill to determine a network node address associated with the selected trunk, loop-back trunks 38 for example. The network node that receives the IAM depends on the network architecture used to implement call monitoring, as explained above. It may be a VASP in accordance with the invention; an ISTP as described in U.S. Pat. No. 5,586,177 which issued to Forris et al on Dec. 17, 1996; an STP; or another SP such as SP 20. If the network is configured with loop-back trunks 38, as in this example, an IAM is returned to the SP 14 by the receiving node. The IAM received by the SP 14 in step 107 logically appears to the SP 14 to be a new inbound call request. The IAM received includes a Circuit Identification Code (CIC) that indicates an inbound trunk member of the monitored trunks. On receipt of the IAM, the SP 14 in step 108 seizes the indicated trunk member on the inbound end of the monitored trunks and delivers the dialled digits from the IAM to the standard pretranslator associated with the inbound end of the monitored trunks. The standard pretranslator associated with the inbound end of the monitored trunk group is identical to the standard pretranslator previously associated with the line attribute index of the subscriber line 12. Therefore, in step 109, the call is routed as any regular call of the same class of service through the PSTN to the destination address. If the call is a local call, the SP 14 completes the call to the dialled number. If the call is a toll call, the SP 14 generates a new IAM, selects an appropriate routeset based on the dialled digits and routes the call to another SP in the network depending on the datafill in the regular translation tables for routing calls in the SP 14.

As will be appreciated from the description that follows, originating call treatment will vary somewhat depending on the network architecture selected to implement a call monitoring system in accordance with the invention. Nonetheless, the principles remain substantially the same as for the treatment of the outbound call using a loop-back trunk to monitor the call described above.

In a clustered network architecture, a call made by a subscriber served by a satellite SP is first routed to the central SP equipped with loop-back trunks for monitoring the call. This is accomplished by assigning a line attribute index to the subscriber line which points to a standard pretranslator that routes the call to a dedicated inter-office trunk member(s) which terminates on the central SP. The satellite SP sends an IAM to the central SP which seizes the dedicated trunk member. The standard pretranslator associated with the inbound end of the dedicated trunk member routes the call to a trunk member equipped for outbound calls of the loop-back trunks, and thereafter call routing is as described above.

In a dedicated inter-office trunk network architecture, the line attribute index assigned to the caller line points to a standard pretranslator that routes the call to a trunk member equipped for outbound calls of the dedicated inter-office trunks. This causes the SP which serves the subscriber to formulate an IAM. The target node for the IAM depends on the way in which data for a Call Detail Record for the call is collected in the network, as will be explained below in detail. In any case, the SP at the terminating end of the dedicated inter-office trunk receives an IAM directly from the SP or from the SP via another node such as a VASP or an ISTP, and thereafter call routing proceeds as for any other call of the same class of service.

INBOUND CALL TREATMENT

Figure 3:
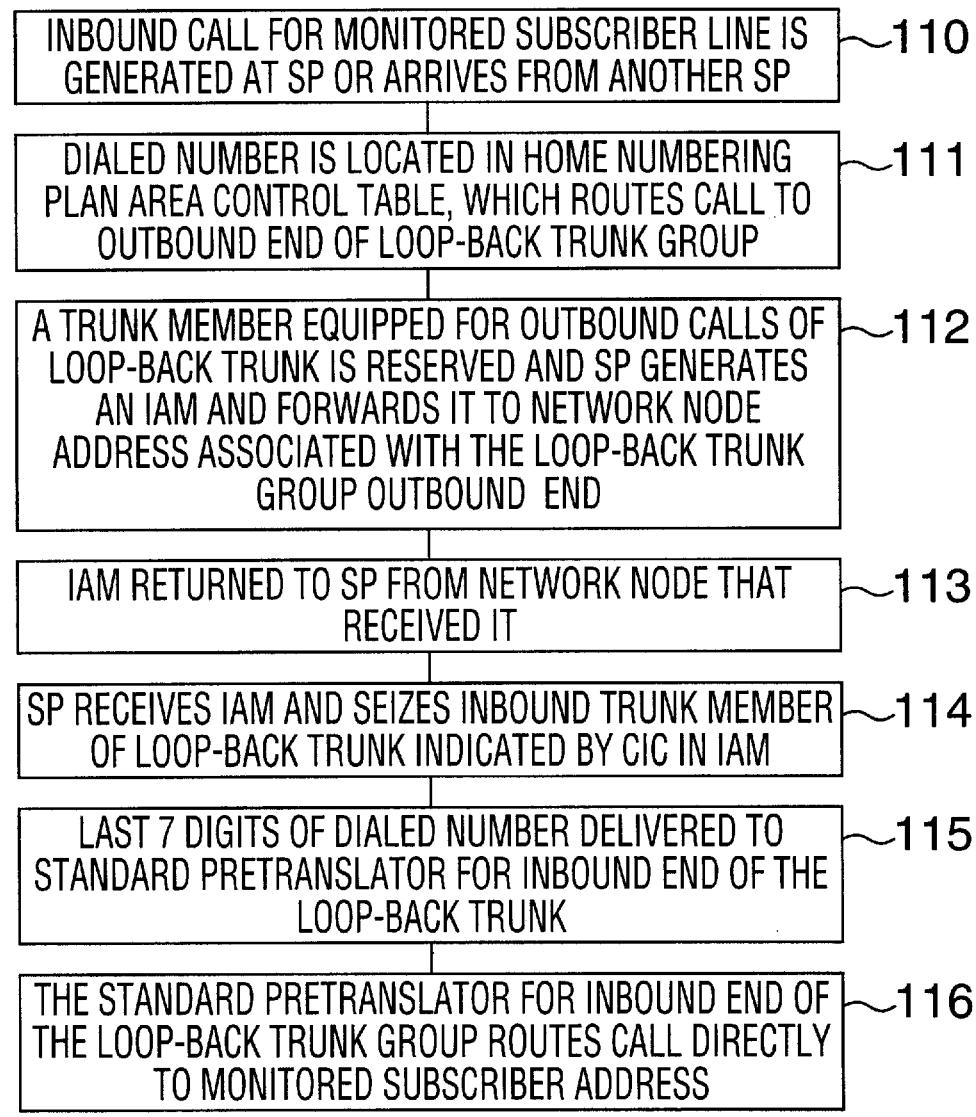
FIG. 3 is a block diagram illustrating the progression of an inbound call to an address to be monitored using the monitoring system in accordance with the invention.

FIG. 3 is a block diagram showing the progression of steps involved in the routing of a call which terminates at a monitored subscriber address served by a SP equipped with loop-back monitoring trunks. In step 110, a call request is received at the SP 14. The call request may be a request which originated at another SP or may have originated from a subscriber line served by the SP 14. In step 111, the last 7 digits of the dialled number are used to locate an entry in a home numbering plan area control table of the SP 14 which in the instance of the monitored subscriber line 12 routes the call to a trunk member of the end of the monitored trunk group equipped for outbound calls, loop-back trunks 38 for example. In step 114, the SP 14 reserves a trunk member of the loop-back trunks 38 equipped for outbound calls, generates an IAM and transmits the IAM over the CCS network to a node in the network pointed to by the linkset and routeset, located as described above. If the monitored trunk is a loop-back trunk, as in this example, an IAM is returned to the SP 14 in step 113. On receipt of the IAM, the SP 14 seizes an inbound trunk member of the loop-back trunks 38 indicated by the CIC in the IAM in step 114. In step 115, the SP 14 extracts from the IAM the last 7 digits of the dialled number which are used to locate an entry in the standard pretranslator associated with the inbound end of the monitored trunk. In step 116, the standard pretranslator associated with the inbound end of the loop-back trunk delivers the call directly to the subscriber line 12. In a standard configuration of switch translation tables, the pretranslator associated with an inbound trunk would normally point to the home numbering plan area control table. For the inbound end of a monitored trunk, however, the standard pretranslator must contain a datafill for the subscriber line 12 to route the call directly to the subscriber line, otherwise the call would terminate in an endless loop, which is a condition to be strictly avoided.

As explained above with respect to outbound calls, as will be appreciated from the description that follows, terminating call treatment will vary somewhat depending on the network architecture selected to implement a call monitoring system in accordance with the invention.

As for outbound calls, in a clustered network architecture an inbound call received at a satellite SP for a subscriber to be monitored is routed to the central SP equipped with loop-back trunks. This is accomplished with the home numbering plan area control table which routes the call to a dedicated trunk member equipped for outbound calls of an inter-office trunk that is connected to the central SP 20. This routing of the call causes the subscriber's SP 14 to formulate and transmit an IAM to the central SP 20 (see FIG. 1B) which seizes the inbound end of the dedicated trunk member. As described above, a pretranslator associated with the inbound end of the dedicated trunk member routes the call to an outbound end of the monitored loop-back trunk and thereafter call routing proceeds as described above with reference to FIG. 3.

Likewise, in a dedicated inter-office trunk group architecture (FIG. 1C), the home numbering plan area control table entry associated with the subscriber address routes the call to an end of the dedicated inter-office monitored trunk group where a trunk member equipped for outbound calls is reserved. This causes the SP 14 which serves the subscriber to formulate an IAM. The target node for the IAM depends on the mechanism used to collect data for a Call Detail Record for the call, as explained below. As explained above in relation to inbound calls, in any case the SP 20 at the terminating end of the dedicated inter-office monitored trunk receives an IAM either directly or indirectly from the SP 14 on the originating end of the inter-office monitored trunk and thereafter call routing proceeds as for any other call of the same class of service.

CALL TREATMENT, SPECIAL CONSIDERATIONS

It should be noted that for all calls, whether outbound or inbound, overflow routing defaults should be provided so that in an instance when all trunk members of a monitored trunk(s) are occupied, the call overflows to normal routing patterns in order to ensure that call monitoring cannot be detected under any circumstances.

The call routing examples described above relate to residential class of service. For Centrex and ISDN customers, the terminating call routing and the monitored trunks remain the same. There are certain minor differences in call routing, however. Centrex customers have classes of service, but they do not have line treatment groups. Instead, Centrex customers are assigned a Network Class of Service (NCOS). The NCOS can be used in the same way as a line treatment group to select different routing options. By using a unique NCOS, a customized standard pretranslator can be used to route all originating calls to a monitored trunk in the same way as described above.

ISDN subscribers also have a NCOS and can therefore be handled in the same way as Centrex subscribers.

It will also be understood by those skilled in the art that if the clustered architecture or the dedicated inter-office trunk architecture are selected to implement the invention in an intelligent switched telephone network, certain adjustments to billing procedures may be required to ensure that all calls are billed as per tariffs. Any adjustments that may be required are considered to be within the ability of one of ordinary skill in the art and are not explained here. It is important, however, that routing from a satellite SP to a central SP equipped with loop-back trunks, for example, to monitor a call will not attract long distance charges if the call would not have otherwise attracted those charges. The criticality of this provision is apparent.

IMPLEMENTATIONS OF THE CALL MONITORING SYSTEM IN THE SWITCHED TELEPHONE NETWORK

As noted above, there are several ways of implementing the invention in an intelligent switched telephone network. Before implementing the invention, a preferred network architecture must be selected, the switching systems in the network must be conditioned accordingly, and a means for capturing details about each monitored call is also preferably provided to facilitate monitoring and/or evidentiary requirements. Call data is available in the CCS ISUP call control messages relating to monitored calls and may be captured from those messages at a number of points in the network as will be described in detail below. Call data information is filtered and formatted as required by a subscriber to the call monitoring system, into a Call Detail Record (CDR), which is preferably communicated directly to the monitoring equipment 40 and displayed and/or recorded simultaneously with the call. The CDR preferably permits a determination of call origin and termination, and tracks any other call events such as call conferencing, call forwarding and/or call transfers. For evidentiary purposes, such information is invaluable.

Each preferred implementation of the call monitoring system in accordance with the invention is described below.

IMPLEMENTATION USING A VASP

Implementation of the invention in an intelligent switched telephone network may utilize a novel apparatus hereinafter referred to as a Virtual Administrative Signaling Point (VASP). The VASP as designed and configured for the implementation of the invention is a dedicated, real time processor which is preferably configured in the CCS network as a STP or a SSP. The VASP is, however, neither a Packet Switch (STP) nor a Service Switching Point (SSP). It is preferably connected to the CCS network using A-links, B-links or D-links but it is not configured to pass through signaling packets as a STP nor is it connected to any subscriber lines, voice or data trunks as a SSP.

ARCHITECTURE OF THE VASP

Figure 4:
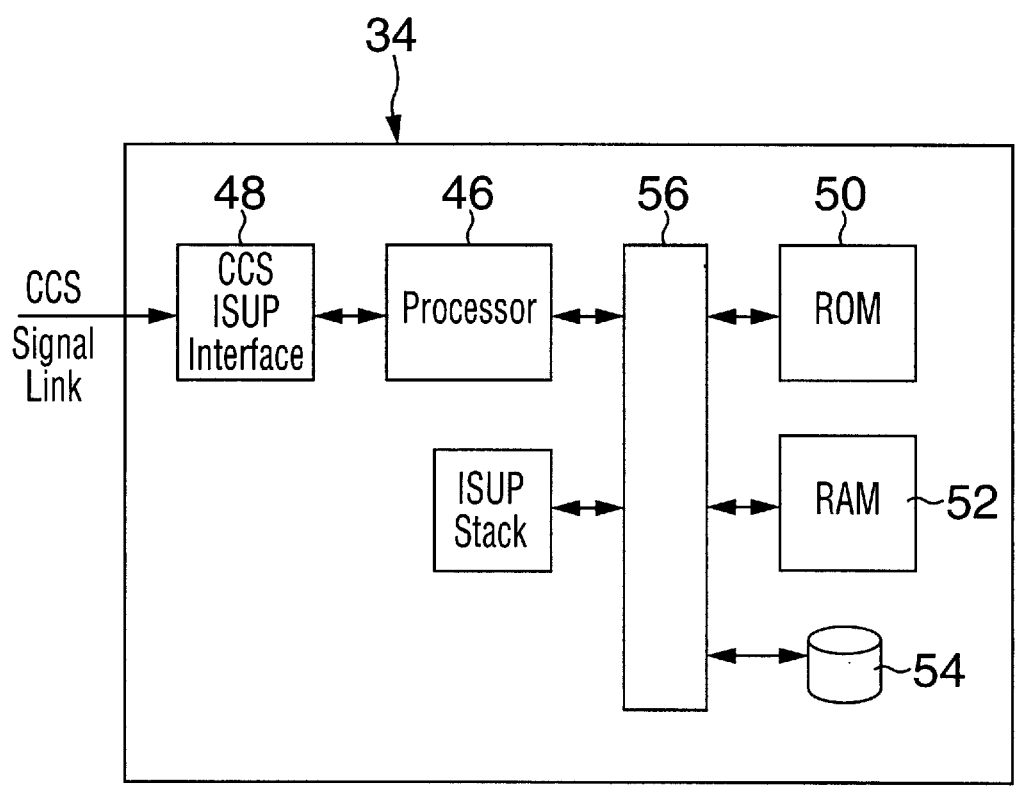
FIG. 4 is a block diagram showing the principal components of an apparatus referred to as a Virtual Administration Signalling Point (VASP) used in certain implementations of the invention in an intelligent switched telephone network.

FIG. 4 is a schematic block diagram showing the principal components of the VASP 34. As explained above, the VASP 34 is preferably logically configured in the CCS network as a STP and is assigned a valid point code accordingly. It is preferably connected to a STP pair, such as STP pair 28 by A-links or B-links, although it may also be directly connected to any SP by an F-link in a manner well known in the art. The VASP is a high-speed computer which includes at least one high-speed processor 46 that controls and operates a CCS ISUP interface 48 for receiving and sending messages over the SS7 network to which the VASP 34 is connected. The VASP 34 also includes ROM memory 50, an abundance of RAM memory 52 and a disk storage medium 54 which serves as a program and data store. The RAM memory 52 is preferably adequate to store all control programs as well as all data required for IAM message processing in order to ensure that processing is not delayed by searches to the disk storage 54. The ROM memory 50, the RAM memory 52 and the disk storage device 54 are respectively connected to a system bus 56. In order to permit the processor 46 to analyze and modify ISUP messages, the VASP 34 is provided with an ISUP stack which may be realized in either hardware or software components or a combination of both. Although illustrated separately for clarity, the ISUP stack may be realized entirely in RAM memory. The ISUP stack permits the contents of any ISUP message field to be examined and modified, if required, in a manner known in the art.

As described above, although the VASP 34 is preferably configured in the network as a STP, to other switching points in the network it appears to function as a SSP and therefore also functions as a virtual switching point in the network.

FIGS. 5A–5E show five implementations of the invention using the VASP 34 with the network architecture shown in FIGS. 1a–1c respectively.

Figure 5A:
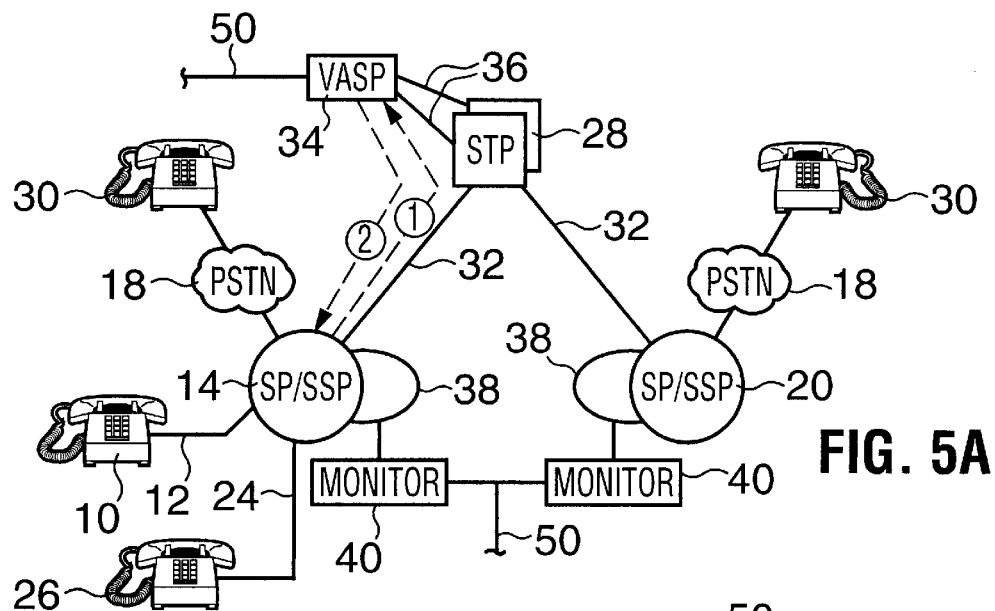
FIGS. 5A–5E respectively show implementations of the invention using a VASP and a portion of the trunk reservation control sequence for outbound and inbound calls in an intelligent switched telephone network.

In FIG. 5A, the VASP 34 is connected by signaling links 36 to the STP pair 28. A data line 50, which may be a TCP/IP connection or any other data transmission protocol, interconnects the VASP 34 with the monitoring equipment 40 connected to each loop-back trunk 38. The data line 50 is used to pass CDR data from the VASP 34 to the respective monitoring equipment 40 to ensure that each call connection is accurately identified.

In order to further illustrate and clarify the method of call monitoring in accordance with this embodiment of the invention, FIGS. 5A–5E also schematically illustrate a portion of the trunk reservation control for calls made using loop-back trunks 38 connected directly to the SP 14. In the case of an outbound call from the subscriber line 12, which is a subscriber line designated to be monitored, the translation tables associated with the subscriber line attribute index operate to cause the SP 14 to reserve a trunk member equipped for outbound calls of the loop-back trunks 38 and formulate a first ISUP IAM message 1 which is forwarded to the VASP 34 as indicated by the correspondingly labelled dashed line that extends along signaling lines 32 and 36 from the SP 14 through a STP 28 to the VASP 34. The VASP 34 receives the ISUP IAM message and loads it into the ISUP stack so that it may be examined and modified as required. In this implementation of the invention, the VASP 34 is programmed to act as a virtual switching point. The VASP 34 therefore transposes the point codes in the IAM and modifies the Circuit Identification Code (CIC) of the IAM using a predefined algorithm related to the arrangement of the loop-back trunks 38 on the SP 14 before returning the message as message 2 to the SP 14. The VASP also dispatches information extracted from the IAM via data line 50 to the monitor 40 associated with the SP 14. Because the point codes are reversed in the IAM, the STP 28 routes the IAM back to the SP 14 which accepts the IAM as an instruction to receive an inbound call on an inbound member of the loop-back trunks 38. The SP 14 therefore seizes the trunk member indicated by the CIC modified by the VASP 34 and consults the pretranslator associated with the inbound end of the loop-back trunks 38 to determine where to route the call. As indicated above, the pretranslator associated with the inbound end of the loop-back trunks 38 is the same pretranslator as normally associated with the subscriber line 12. If the outbound call from the subscriber line 12 is directed to a subscriber line 24 served by the SP 14, the call is completed as any local call to subscriber line 24 and subscriber phone 26. If the call is a long distance call, the call is routed to the PSTN 18 and to a PSTN subscriber phone 30 as any normal long distance call in a manner well known in the art. It should be noted that all ISUP control messages relating to the call are passed through VASP 34 which is logically viewed by the intelligent switched telephone network as a switching point in the call path. Consequently, call-related data from any call control message may be passed over data line 50 to the monitoring equipment 40 and stored in the CDR as determined by the data filter in use.

If an inbound call is directed to subscriber line 12 from either the PSTN phone 30 or the local phone 26, the call sequence is essentially the reverse of that described above for an outbound call. When SP 14 receives a call request for the subscriber line 12 from either PSTN 18 or a local phone 26, the home numbering plan area control table entry associated with subscriber line 12 directs the call onto a trunk member equipped for outbound calls in the loop-back trunks 38 which causes the SP 14 to formulate an IAM message that is dispatched through STP 28 to the VASP 34 as described above. The VASP 34 performs all the actions described above and returns an IAM to the SP 14. The SP 14 responds by seizing an inbound member of the loop-back trunks 38, which it assumes to be an inbound call on that trunk and checks the pretranslator associated with the inbound end of the loop-back trunks 38. A normal pretranslator for an inbound trunk group would direct the SP 14 to the home numbering plan area control table. In this instance, however, the pretranslator is modified so that the call is routed directly to subscriber line 12 since reference to the home number plan area control table would route the call back to the outbound end of the loop-back trunks 38 and set up an endless loop, which must be strictly avoided.

Figure 5B:
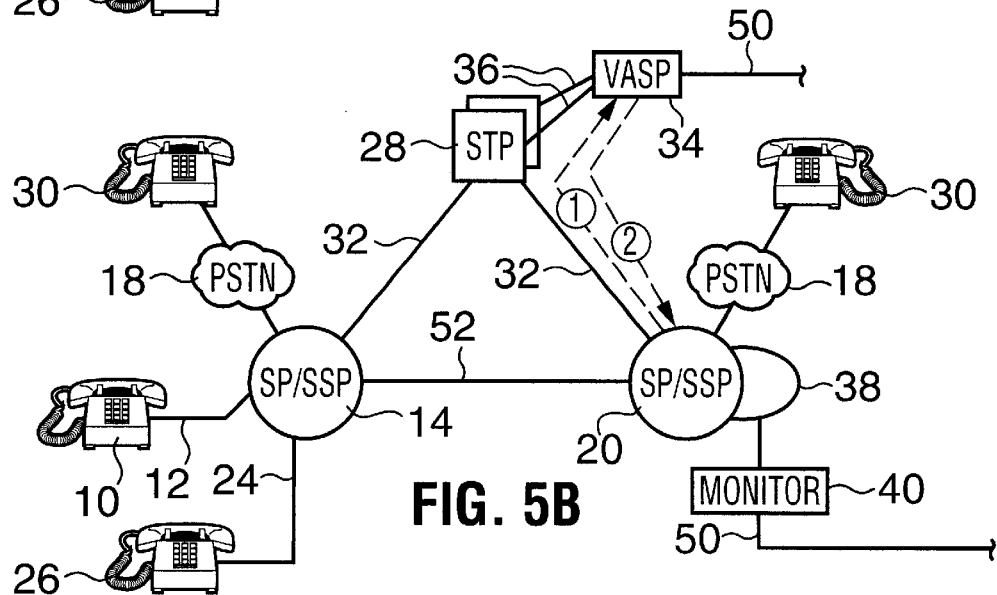

FIG. 5B shows an implementation of the network architecture shown in FIG. 1b. Using the VASP 34. This architecture is essentially identical to that shown in FIG. 5A with the exception that a SP 14 is clustered with the SP 20 and loop-back trunks 38 are provided only on SP 20. The VASP 34 is connected in the same way to the STP pair 28 by signaling links 36. It is also connected in the same way by a data line 50 to the monitoring equipment 40 connected to the loop-back trunks 38. Furthermore, the trunk allocation control in any call sequence is identical to that described above with the exception that calls made to or from subscriber line 12 which is serviced by SP 14 must be routed through SP 20 and subsequently over the loop-back trunks 38. The translation tables associated with the subscriber line 12 are therefore modified to route all calls to or from subscriber line 12 onto a dedicated inter-office trunk group 52 or a dedicated member(s) of trunk group 52 which interconnects the SP 14 and the SP 20. A pretranslator associated with the inbound end of the dedicated member(s) of the trunk group 52 routes all calls received on that dedicated trunk member(s) to the outbound end of a trunk member of the loop-back trunks 38. Thereafter, the IAM trunk reservation control is exactly as described above in relation to FIG. 5A whereby the SP 20 formulates and routes an IAM 1 to the VASP 34 through a STP 28. The VASP 34 examines and modifies the IAM as described above and returns an IAM 2 to the SP 20 which seizes a member of the inbound end of the loop-back trunks 38 and thereafter routes the call as any ordinary PSTN call.

Figure 5C:
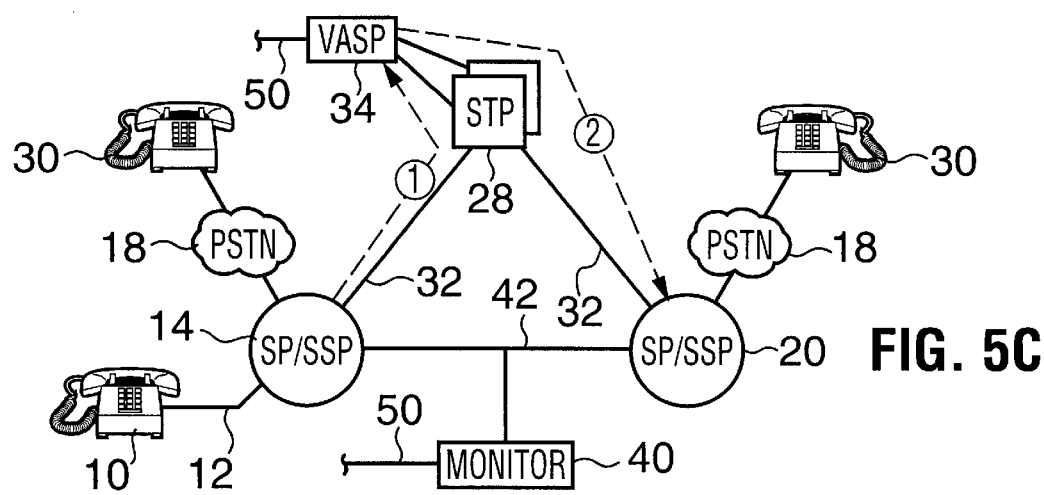

FIG. 5C shows the network architecture of FIG. 1c implemented using the VASP 34. In this network architecture, the monitoring equipment 40 is bridged to a dedicated inter-office trunk group 42. When a call originates from or terminates to the subscriber line 12, the translation tables in the SP 14 route the call onto a trunk member equipped for outbound calls of the dedicated trunk group 42 which causes the SP 14 to formulate an IAM 1 that is sent through a STP 28 to the VASP 34. In this implementation, the VASP serves as a virtual tandem between SP 14 and SP 20 so that CCS call control messages are routed through the VASP to provide CDR data to the monitor 40 through the data line 50. Consequently, the VASP must normally include a point code mapping table, assuming that it serves more than one pair of SPs. The point code mapping table associates the point code of SP 14 with the point code of SP 20 and vice versa using the CIC code and the originating point code in the ISUP message as an index. For instance, when the VASP 34 receives an IAM 1 from the SP 14, the VASP 34 must substitute its own point code for that of the SP 14 in the Originating Point Code (OPC) field of the IAM 1 and consults the point code mapping table to determine the point code of SP 20. It replaces the Destination Point Code (DPC) of IAM 1 with the point code of the SP 20 derived from the point code mapping table. After the VASP has modified the IAM accordingly, it forwards an IAM 2 to the SP 20 which causes the SP 20 to seize the corresponding member of the inbound end of trunk group 42 indicated by the CIC of IAM 2. Thereafter, trunk reservatuion control proceeds as for any PSTN telephone call of the same class of service.

Figure 5D:
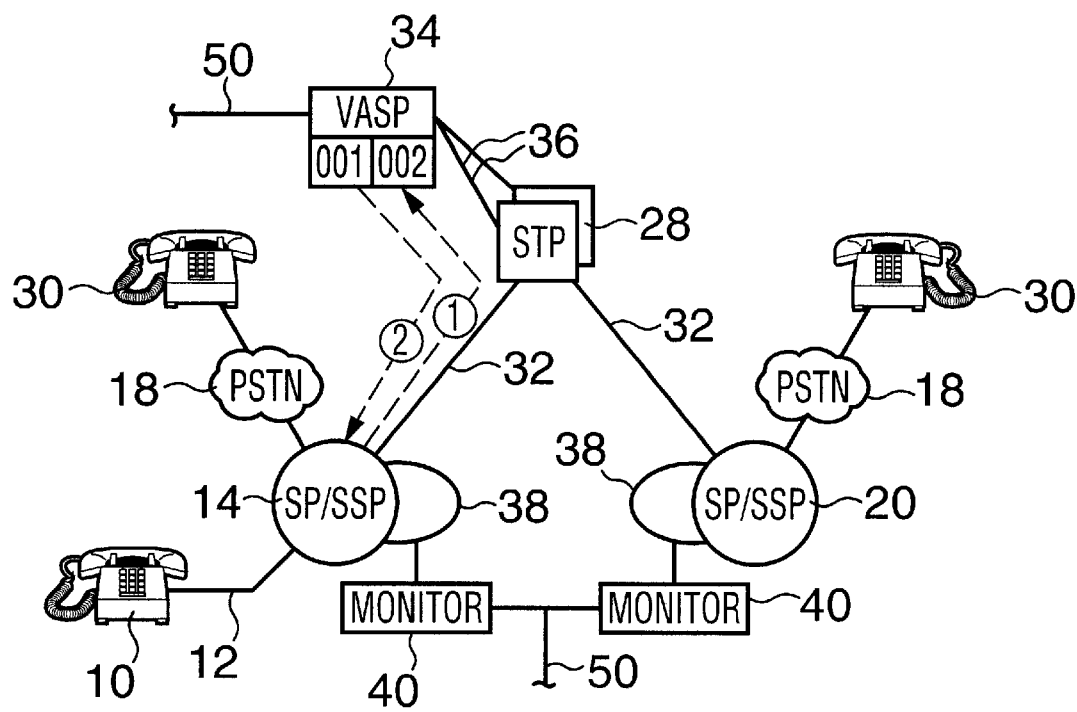

FIG. 5D shows the VASP 34 in the same network architecture as described above with reference to FIG. 5A, with the exception that the VASP 34 is assigned two valid point codes, 001 and 002 for example. All call processing and call routing is substantially the same as described above with the exception that the VASP 34 does not require an algorithm for modifying the CIC of ISUP messages. Because the CIC is only unique to a linkset/routeset, the corresponding ends of trunk members in the loop-back trunks 38 may be assigned the same CIC if the VASP 34 is assigned two point codes. Consequently, when SP 14 generates an IAM 1 the DPC may be 002, for example, which would route the IAM 1 to the VASP 34 point code 002. When the VASP 34 receives the IAM 1, it moves the OPC to the DPC and inserts its second point code, 001 for example, in the OPC. The returned IAM 2 is then routed by a STP 28 to the SP 14 which seizes the corresponding end of the inbound end of the trunk member of the loop-back trunks 38 indicated by the CIC, which remained unchanged. Call routing thereafter proceeds as for any other PSTN call of the same class of service.

Figure 5E:
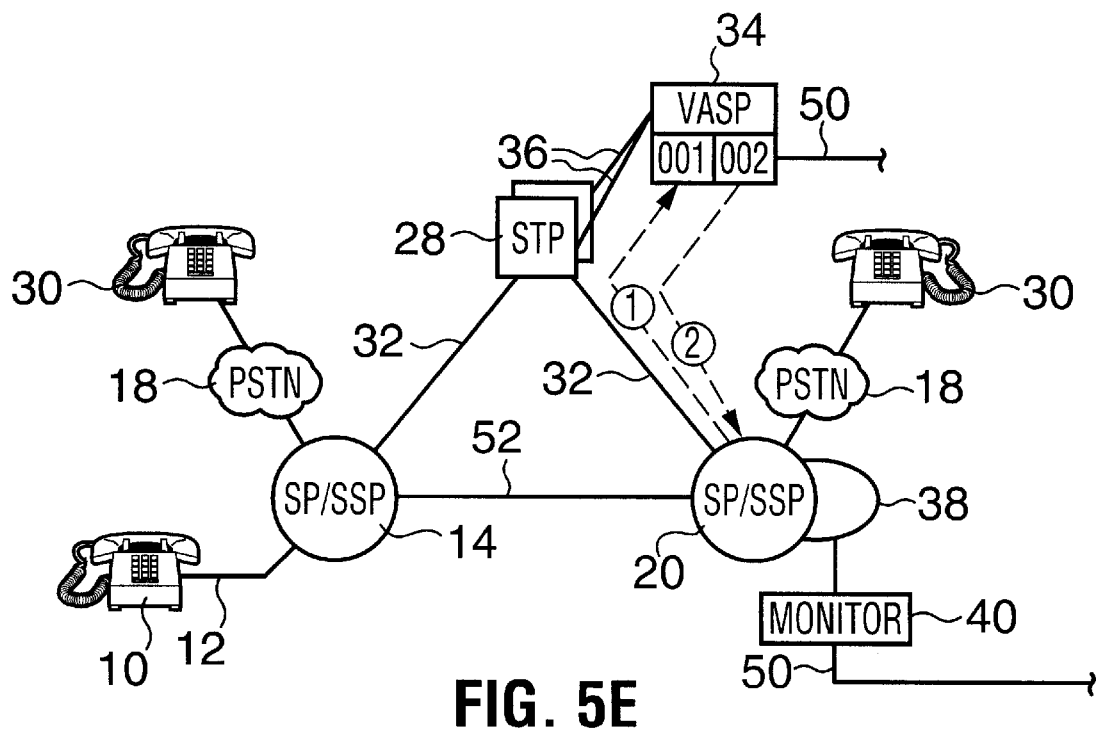

FIG. 5E shows the VASP 34 in the same network architecture described above with reference to FIG. 5B with the exception that VASP 34 is assigned two valid point codes, as described above. All call and ISUP message routing is the same as described with reference to FIG. 5B except that when the SP 20 generates a first IAM 1, the linkset/routeset associated with the outbound end of the loop-back trunks 38 directs the IAM 1 to the VASP 34 point code 001, for example. As described above, when the VASP 34 receives the IAM 1, it need only move the OPC to the DPC and insert its second point code, 002 for example, into the OPC. When it returns the modified IAM 2, the SP 20 receives the IAM 2 and seizes the inbound member of the loop-back trunks 38 as described above. Thereafter, call routing proceeds as for any other PSTN call of the same class of service.

It should be noted that although in the examples described above with reference to FIGS. 5D and 5E the corresponding ends of trunk members in the loop-back trunks 38 were assigned the same CIC, nothing requires that they be assigned the same CIC. They may be assigned different CICs, in which case an algorithm would be used to modify the CIC code in the IAM at the VASP, as described above with reference to FIGS. 5A–5C.

IMPLEMENTATION USING AN ISTP

The monitoring system in accordance with the invention may also be implemented using an ISTP which, as noted above, is described in U.S. Pat. No. 5,586,177 that issued Dec. 17, 1996 to Forris et al.

Figure 6A:
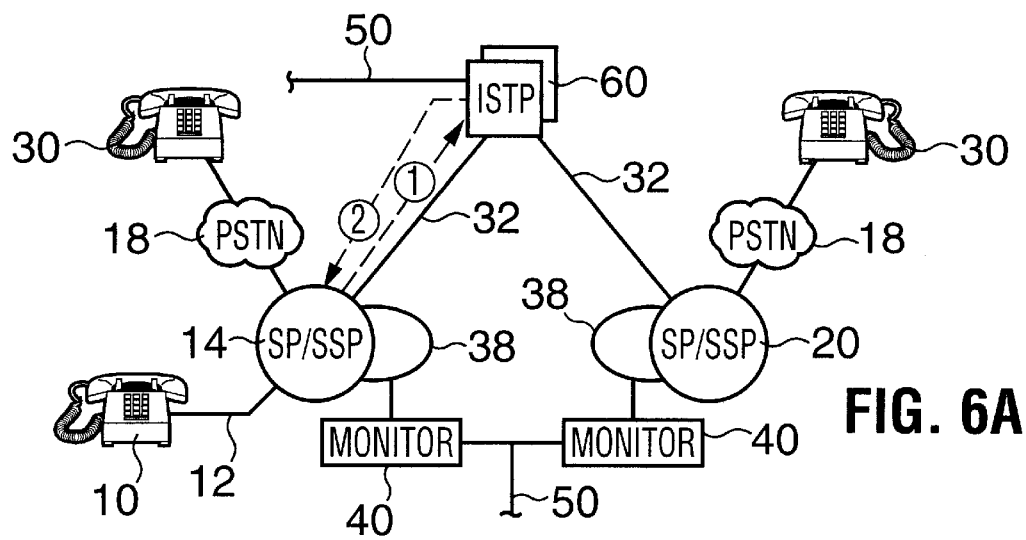
FIGS. 6A–6C respectively show implementations of the invention using an ISTP and a portion of the trunk reservation control sequence for outbound and inbound calls in an intelligent switched telephone network.
Figure 6B:
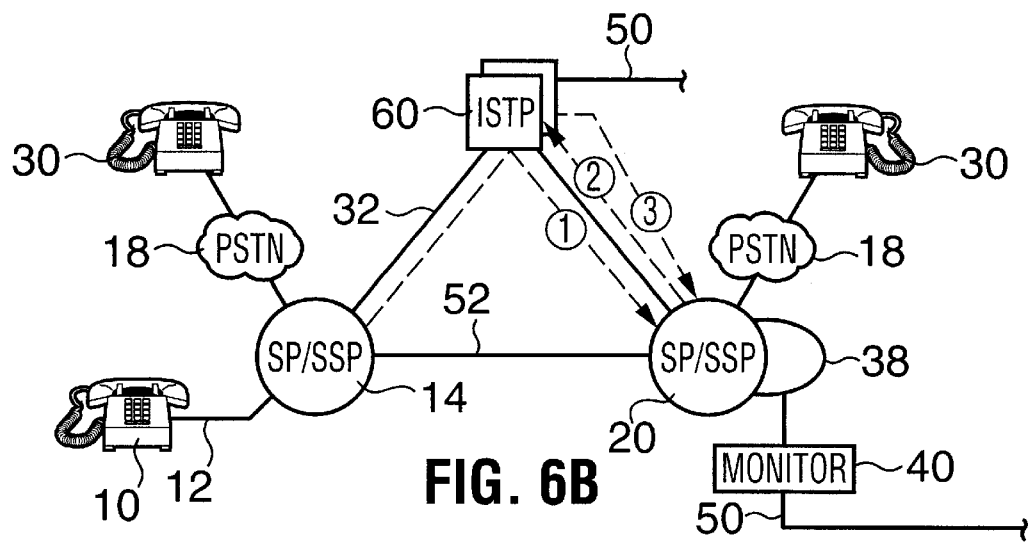
Figure 6C:
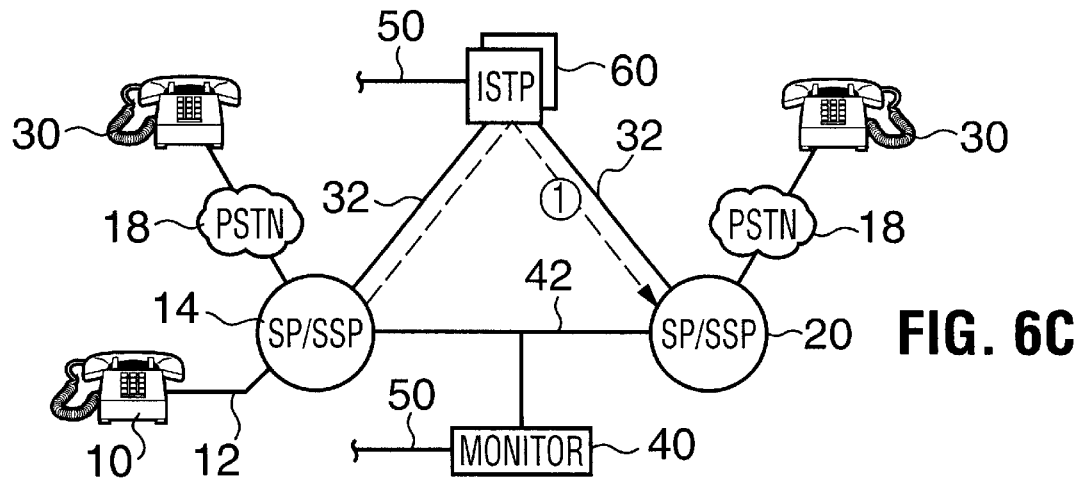

FIGS. 6A–6C show implementations of the monitoring system in accordance with the invention using an ISTP 60.

The ISTP 60 is capable of capturing SS7 ISUP messages in accordance with specific triggers such as the occurrence of the address of the monitored user line 12 in the called party or calling party fields of an ISUP call control message. The ISTP 60 is also capable of modifying fields in an ISUP message in much the same way as the VASP is capable of such modification of ISUP messages. The ISTP is further enabled for TCP/IP signaling and would appear to be adapted to be programmed to pass CDR data over a data line 50 to the monitoring equipment 40 (see FIGS. 6A–6C).

IAM trunk reservation control using the ISTP 60 is essentially the same as described above for the VASP 34. When a call is originated from or terminated to the user line 12, it is routed as explained above with relation to FIGS. 5A–5C to the loop-back trunks 38 connected to the SP 14 shown in FIG. 6A. This causes the SP 14 to create a IAM 1 which it dispatches using the modified linkset and routeset for the outbound end of the loop-back trunks 38, which sends the IAM 1 to the ISTP 60. On receipt of the IAM 1, triggers set in the ISTP cause the ISTP 60 to modify the IAM 1 by transposing the point codes and modifying the CIC to indicate a member of the inbound end of the loop-back trunks 38. The ISTP then dispatches the modified IAM as an IAM 2 to the SP 14 which seizes the indicated trunk member of the inbound end of the loop-back trunks 38. Thereafter, IAM trunk reservation control proceeds as for any normal PSTN call.

FIG. 6B illustrates the implementation of the invention using a cluster architecture in conjunction with an ISTP 60. This implementation functions substantially identically to the implementation described above with reference to FIG. 5B. When a call originates from or terminates to the user line 12 served by SP 14, the translation tables for user line 12 route the call to a dedicated member(s) equipped for outbound calls of trunk group 52 which causes the SP 14 to send an IAM 1 through ISTP 60 to SP 20. The pretranslator for the inbound member(s) of trunk group 52 routes the call to the outbound end of the loop-back trunks 38 and causes the SP 20 to send an IAM 2 to the ISTP 60 which receives the IAM 2 and modifies it as described above with reference to FIG. 5B. The ISTP 60 then returns an IAM 3 to the SP 20 which causes the SP 20 to seize the indicated inbound member of the loop-back trunks 38. IAM trunk reservation control thereafter proceeds as for any other PSTN call of the same class.

FIG. 6C shows the implementation of the invention using a dedicated inter-office trunk group 42 and an ISTP 60. In this network architecture, the monitoring equipment 40 is bridged to the dedicated inter-office trunk group 42, as described above with reference to FIG. 5C. Since the ISTP 60 is a packet switch which functions as an STP, in this instance the ISTP is only required to capture CDR data and forward it over data line 50 to the monitoring equipment 40. Therefore, when a call originates from or terminates to subscriber line 12, the translation tables in the SP 14 cause the SP 14 to route the call to a trunk member equipped for outbound calls of the dedicated trunk group 42 and formulate an IAM message which is forwarded over signal line 32 to the ISTP 60. The ISTP 60 is triggered by receipt of the IAM 1 to capture a copy of the IAM 1 which it forwards over the data line 50 to the monitoring equipment 40. The ISTP 60 then forwards the IAM 1 to the SP 20 which is the destination point code for the IAM 1. Receipt of the IAM 1 by the SP 20 causes the SP 20 to seize an inbound member of the dedicated trunk group 42 indicated by the CIC of the IAM 1. Thereafter, IAM trunk reservation control continues as for any other PSTN call of the same class.

IMPLEMENTATION USING A SP

Figure 7A:
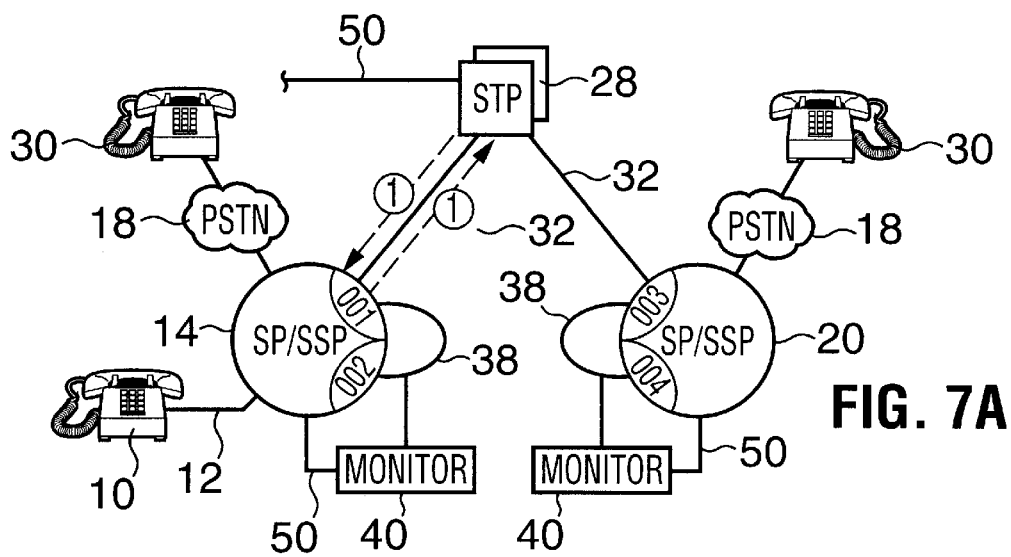
FIGS. 7A–7C respectively show implementations of the invention using an SP that is equipped to accommodate at least two valid point codes, and a portion of the trunk reservation control sequence for outbound and inbound calls in an intelligent switched telephone network.
Figure 7B:
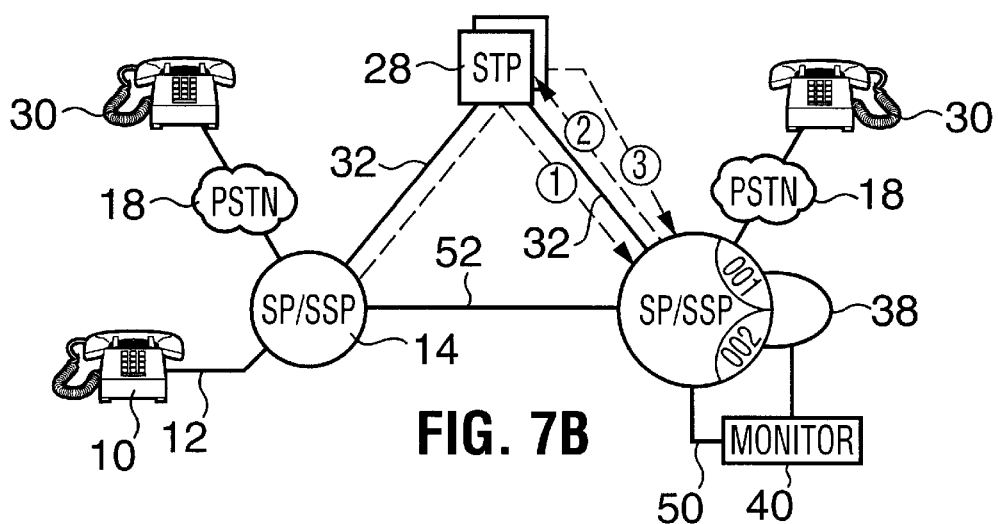
Figure 7C:
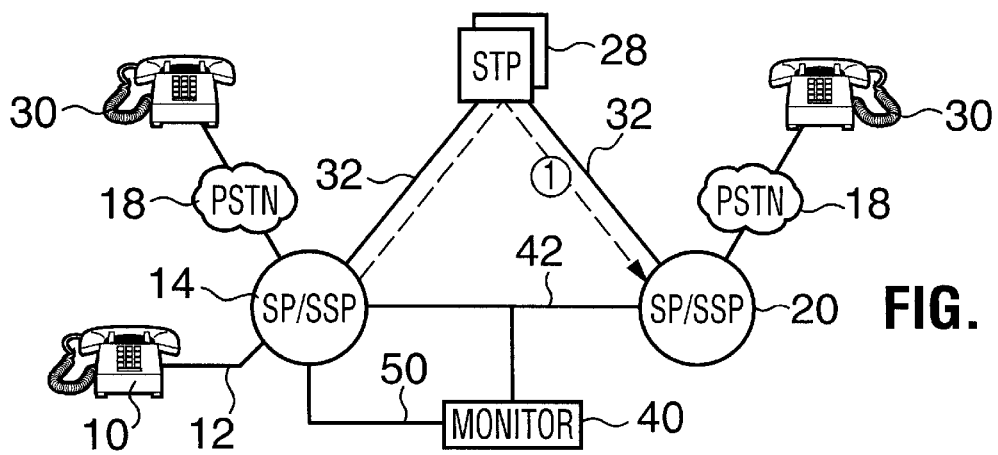

FIGS. 7A–7C show implementations of the call monitoring system in accordance with the invention using a SP. This implementation assumes that the SP 14, 20 is equipped to accommodate at least two valid point codes. For the purposes of example, the two valid point codes are illustrated as 001, 002; and 003, 004 respectively. In essence, each SP 14, 20 is logically two separate SPs in a single switching point. In the network architectures shown in FIGS. 7A–7C, the SP is also enabled to capture call detail information from CCS call control messages. However, other means for collecting CDR data may be provided, such as SS7 monitors connected to the signal links 32, as will be explained in more detail with reference to FIG. 8, or a VASP or an ISTP, as will be explained below.

FIG. 7A shows a network architecture in which each of SP 14 and SP 20 is in enabled to accommodate two point codes. The outbound end of the loop-back trunks 38 is, for example, associated with the point code 001 and the inbound end of the loop-back trunks 38 is associated with the point code 002 in the SP 14. In this network architecture, when a call is originated from or terminated to the user line 12, the translations in the SP 14 route the call to the outbound end of the loop-back trunks 38 as described above with reference to FIG. 5A, which causes the SP 14 to formulate an IAM 1 which it forwards to the point code 002 over the signal line 32 to the STP 28. On receipt of the IAM 1, the STP 28 transmits the message back over the signal line 32 to the SP 14 point code 002 which receives the message and seizes a member of the inbound end of the loop-back trunks 38 indicated by the CIC in the IAM 1. In this instance, since the SP 14 accommodates two point codes; the CICs for corresponding ends of the loop-back trunks 38 are identical, and no modification of the CIC is required. Thereafter, the IAM trunk reservation control proceeds as for any other PSTN call of the same class. CDR data relating to any monitored call originating from or terminating to subscriber line 12 must also be supplied to the call monitoring equipment 40. Some SSPs are enabled to collect data from CCS call control messages and output such data over data links, such as data line 50. In this network architecture, it is assumed that the SP 14, 20 has the capability to capture SS7 message information and output that message information to the call monitoring equipment 40. The capturing of the SS7 message information can be triggered by AIN triggers or a trigger associated with the translation tables for subscriber line 12.

FIG. 7B shows a clustered architecture implementation of the call monitoring system in accordance with the invention wherein the SP 20 is enabled to accommodate two point codes respectively associated with the inbound end and the outbound end of the loop-back trunks 38. The IAM trunk reservation control for this architecture functions essentially as described above in relation to FIG. 5B. When a call originates from or terminates to subscriber line 12, the translation tables associated with subscriber line 12 cause the SP 14 to route the call to a dedicated member(s) equipped for outbound calls of the inter-office trunk group 52. The SP 14 reserves an unoccupied trunk member equipped for outbound calls and formulates an IAM 1 which it dispatches over signal links 32 through STP 28 to the SP 20. On receipt of the IAM 1, the SP 20 seizes the corresponding inbound end of the dedicated trunk member in trunk group 52. The pretranslator associated with the dedicated trunk group 52 routes the call to the outbound end of the loop-back trunks 38 which causes the SP 20 (point code 003) to formulate an IAM 2 which is sent over signal line 32 to the STP 28. The STP 28 returns the IAM 2 to the point code 004 of the SP 20 as stipulated by the DPC of the IAM 2. Receipt of the IAM 2 by the SP 20 causes the SP 20 to seize the inbound member of the loop-back trunks 38 indicated by the CIC of the IAM 2. Thereafter, IAM trunk reservation control proceeds as per any other PSTN call of the same class. As described above with reference to FIG. 7A, it is assumed that the SP 20 is enabled to capture SS7 call control message data and transfer it by data line 50 to the monitoring equipment 40. If the SP 20 does not have that capability, the SS7 call data may be collected by other means, as will be described below.

FIG. 7C shows the implementation of the call monitoring system in accordance with the invention in a network architecture which uses inter-office dedicated trunk group 42 and an SP 14 enabled to capture CDR data and pass that data over a data line 50 to the monitoring equipment 40. The IAM trunk reservation control for this architecture is essentially the same as described above with reference to FIG. 6C. When a call originates from or terminates to the subscriber line 12, the translation tables of the SP 14 route the call to a trunk member equipped for outbound calls of the dedicated trunk group 42. In response, the SP 14 formulates an IAM 1 which it transmits over signal links 32 to STP 28 which forwards the IAM 1 to the SP 20. Receipt of the IAM 1 causes the SP 20 to seize the corresponding inbound trunk member of the dedicated trunk group 42 and IAM trunk reservation control proceeds thereafter as with any other PSTN call of the same class. As described above, the SP 14 is enabled to capture CDR data and to output that data over data line 50 to the monitoring equipment 40 each time a call is originated from or terminated to the subscriber line 12.

It will be readily appreciated by persons skilled in the art that CDR data may also be captured and output to the monitoring equipment 40 by an ISTP 60 (see FIGS. 6A–6C) in each of the network architectures shown in FIGS. 7A and 7B. In that instance, the STP pair 28 is replaced by an ISTP pair 60 which is triggered to collect CDR data on receipt of any ISUP message containing the monitored subscriber address in either the calling or the called number field.

It will also be appreciated by those skilled in the art that a VASP 34 could also be used in the network architectures shown in FIGS. 7A and 7B to capture CDR data and output it to the monitoring equipment 40. Nonetheless, the architectures shown in FIGS. 5D and 5E where two point codes are used on the VASP rather than on the SP 14, 20 are considered a more efficient use of the CCS signaling links.

IMPLEMENTATION USING A CCS LINK MONITOR

Figure 8:
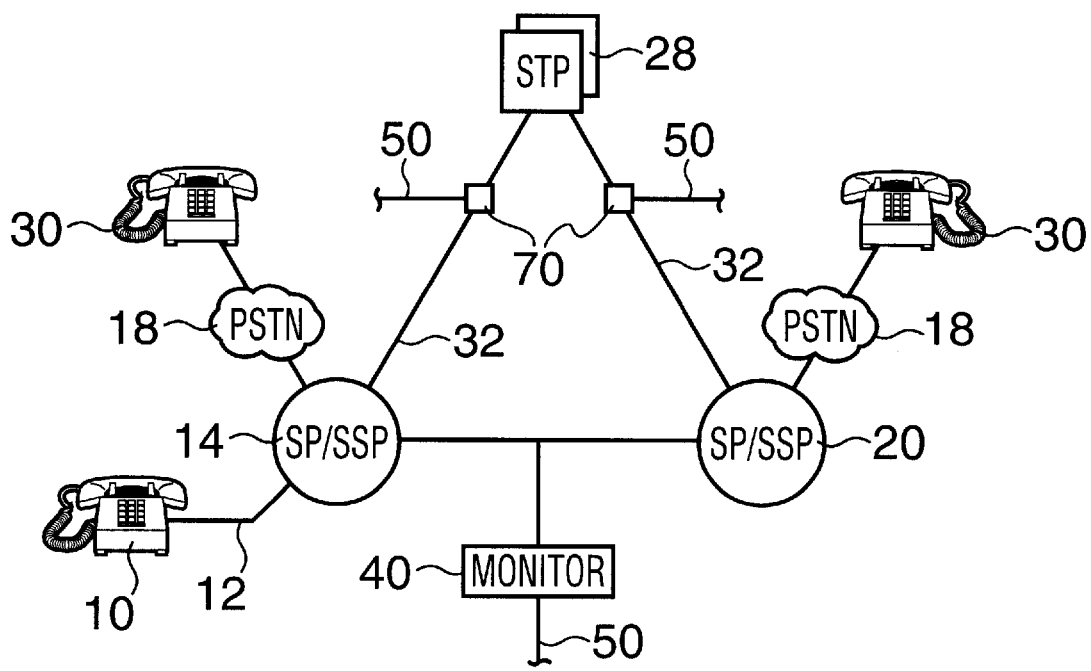
FIG. 8 shows another implementation of the invention in which CCS-trunk monitors collect Call Detail Record (CDR) information for documenting particulars about a call being monitored.

FIG. 8 shows yet another implementation of the invention using the architecture shown in FIG. 1c wherein a dedicated inter-office trunk group 42 is used for the implementation of the call monitoring system in accordance with the invention. In accordance with this implementation, translation tables in the SP 14 route all calls originating from or terminating to the subscriber line 12 to a dedicated member(s) equipped for outbound calls of inter-office trunk group 42. This causes SP 14 to formulate an IAM 1 which is dispatched over signal links 32 to the STP 28. The STP 28 forwards the IAM 1 to SP 20, which is the terminating point code of the IAM 1. On receipt of the IAM 1, the SP 20 seizes the inbound end of the dedicated trunk member of the inter-office trunk group 42 indicated by the CIC of the IAM 1 and thereafter IAM trunk reservation control proceeds as for any other PSTN call of the same class.

CDR data for the call is collected by signal link monitors 70 which made be, for example, A7-CDR units available from the Hewlett-Packard Corporation, U.S.A. The signal link monitors 70 may be triggered to capture call information for any originating and/or terminating address and pass that information over signal lines 50 to the call monitor 40. Thus, when a call originates from or terminates to subscriber line 12, CCS link monitors 70 capture the CDR data associated with the call and pass that data over data line 50 to the call monitoring equipment 40.

It will also be understood by persons skilled in the art that the link monitors 70 could be used in either of the network configurations shown in FIGS. 7A or 7B, in place of enabling SPs 14, 20 to capture CDR date from the ISUP messages relating to calls originating from or terminating to subscriber line 12.

A novel method, network architecture and apparatus for monitoring calls undetectably in an intelligent switched telephone network has been described. Changes and modifications to the preferred embodiments of the invention described above will no doubt become apparent to those skilled in the art. The scope of the invention is therefore intended to be limited solely by the scope of the appended claims.

We claim:

1. A method of monitoring selected telecommunications sessions in an intelligent switched telephone network wherein a subscriber address served by the network is designated as an address to be monitored, comprising the steps of:

a) routing all originating and all terminating call requests for the subscriber address through a monitored trunk in the network; and b) otherwise, handling the calls as any other call request of the same class of service.

2. A method of monitoring selected telecommunications sessions in an intelligent switched telephone network as claimed in claim 1 further comprising the step of collecting data about the call and transmitting the collected data to equipment for monitoring the monitored trunk.

3. A method of monitoring selected telecommunications sessions in an intelligent switched telephone network as claimed in claim 1 wherein any switching point (SP) where monitoring is required in the network enabled for ISUP CCS messaging is equipped with at least one loop-back monitored trunk.

4. A method of monitoring selected telecommunications sessions in an intelligent switched telephone network as claimed in claim 1 wherein only selected switching points (SPs) in the network are equipped with at least one loop-back monitored trunk and the network is configured in a clustered architecture for call monitoring.

5. A method of monitoring selected telecommunications sessions in an intelligent switched telephone network as claimed in claim 4 wherein calls to or from a selected subscriber address served by a one of the other switching points in the network are routed to the selected switching system over a trunk member dedicated to that purpose.

6. A method of monitoring selected telecommunications sessions in an intelligent switched telephone network as claimed in claim 1 wherein the monitored trunk is an interoffice trunk dedicated to monitoring the selected telecommunications sessions.

7. A method of monitoring selected telecommunications sessions in an intelligent switched telephone network as claimed in claim 3 wherein the network includes a VASP and step a) comprises:
   i) routing all originating and all terminating call requests for the subscriber address to a trunk member of the loop-back trunk equipped for outbound calls;
   ii) preparing and dispatching an ISUP IAM for the call request to the VASP;
   iii) receiving the IAM at the VASP and modifying the IAM by transposing the originating and terminating point codes and modifying the CIC of the IAM to indicate an inbound end of the trunk member of the loop-back trunk equipped for outbound calls;
   iv) transmitting the modified IAM back to the switching point; and
   v) seizing the inbound end of the trunk member of the loop-back trunk and thereafter routing the call as any other call request of the same class of service.

8. A method of monitoring selected telecommunications sessions in an intelligent switched telephone network as claimed in claim 3 wherein the network includes an ISTP and step a) comprises:
   i) routing all originating and all terminating call requests for the subscriber address to a trunk member of the loop-back trunk equipped for outbound calls; ii) preparing and dispatching an ISUP IAM for the call request to the ISTP;
   iii) receiving the IAM at the ISTP and modifying the IAM by transposing the originating and terminating point codes and modifying the CIC of the IAM to indicate an inbound end of the trunk member of the loop-back trunk equipped for outbound calls;
   iv) transmitting the modified IAM back to the switching point; and
   v) seizing the inbound end of the trunk member of the loop-back trunk and thereafter routing the call as any other call request of the same class of service.

9. A method of monitoring selected telecommunications sessions in an intelligent switched telephone network as claimed in claim 3 wherein the switching point is equipped to accommodate at least two point codes and step a) comprises:
   i) routing all originating and all terminating call requests for the subscriber address to a trunk member of the loop-back trunk equipped for outbound calls;
   ii) preparing and dispatching an ISUP IAM for the call request to a point code associated with and inbound end of the trunk member of the loop-back trunk equipped for outbound calls;
   iii) receiving the IAM at the point code associated with the trunk member of the loop-back trunk equipped for outbound calls;
   iv) seizing the inbound end of the trunk member of the loop-back trunk and thereafter routing the call as any other call request of the same class of service.

10. A method of monitoring selected telecommunications sessions in an intelligent switched telephone network as claimed in claim 5 wherein the network includes a VASP and step a) comprises:
    i) routing all originating and all terminating call requests for the subscriber address to a one of the trunk member (s) dedicated to that purpose that is equipped for outbound calls;
    ii) preparing and dispatching an ISUP IAM for the call request to the selected switching point;
    iii) receiving the IAM at the selected switching point and seizing an inbound end of the one of the trunks dedicated to that purpose, then routing the call to a trunk member of the loop-back trunk equipped for outbound calls and preparing and dispatching an IAM for the call to the VASP;
    iv) receiving the IAM at the VASP and modifying the IAM by transposing the originating and terminating point codes and modifying the CIC of the IAM to indicate an inbound end of the trunk member of the loop-back trunk equipped for outbound calls;
    iv) transmitting the modified IAM back to the selected switching point; and
    v) seizing the inbound end of the trunk member of the loop-back trunk and thereafter routing the call as any other call request of the same class of service.

11. A method of monitoring selected telecommunications sessions in an intelligent switched telephone network as claimed in claim 1 wherein the routing at the switching point is effected by conditioning the switching point to route calls for the network address designated to be monitored.

12. A method of monitoring selected telecommunications sessions in an intelligent switched telephone network as claimed in claim 11 wherein the conditioning involves creating appropriate entries in translation tables of the switching point to which the outbound end of the monitored trunk is connected so that all outbound calls from the subscriber address are routed to the monitored trunk, regardless of whether the outbound call is to an address served by the switching point or by another switching point, and modifying an inbound pre-translator of the switching point to avoid an endless loop condition enabled by the entries in the translation tables for outbound calls.

13. A method of monitoring selected telecommunications sessions in an intelligent switched telephone network as claimed in claim 1 wherein the monitored trunk is a channel of a T1 trunk.

14. A virtual administrative signaling point for controlling at least a part of the setup of selected telecommunications sessions to be monitored in an intelligent switched telephone network having at least one monitored trunk, comprising:
    a processor;
    a memory;
    a common channel signaling interface for sending and receiving common channel signaling messages;
    means for analyzing the contents of a common channel signaling message received by the virtual signaling point; and
    means for modifying the contents of a common channel signaling ISUP IAM to change an originating point code of the message to that of the virtual administrative signaling point and a terminating point code to that of a switching point where the monitored trunk terminates, and, if required, modify a circuit identification code (CIC) of the message to indicate the circuit identification of the monitored trunk termination.

15. A virtual administrative switching point as claimed in claim 14 further including means for collecting Call Detail Record data from the ISUP IAM message.

16. A virtual administrative switching point as claimed in claim 15 further including means for transmitting the call detail data to equipment for monitoring the monitored trunk.

17. A system in an intelligent switched telephone network for monitoring a subscriber address served by the network when the subscriber address is designated as an address to be monitored, the system comprising:

at least two SPs respectively having a line side and a trunk side, the SPs having a plurality of subscriber lines connected to the line side thereof and a plurality of inter-office trunks connected to the trunk side thereof, and each SP having an interface for connection with a common channel signaling system and means for generating, receiving and responding to common channel signaling messages;

at least one of the SPs in the network being equipped with at least one trunk equipped for outbound calls which is connected to monitoring equipment;

a virtual signaling point connected with the common channel signaling system of the network, the virtual signaling point having an ISUP point code;

the SPs having means for routing all originating and terminating call requests for the subscriber address to the SP in the network equipped with the at least one trunk equipped for outbound calls which is connected to the monitoring device;

the SP in the network having means for routing all call requests for the subscriber address onto one of the at least one monitored trunks equipped for outbound calls and dispatching an IAM via the common channel signaling system to the virtual signaling point;

the virtual signaling point having means for receiving the IAM and modifying the IAM to change an originating point code of the message to the point code of the virtual signaling point and a terminating point code of the message to a point code of the SP where the monitored trunk terminates, and, if required, means for modifying a circuit identification code (CIC) of the IAM to indicate the monitored trunk termination; and the virtual signaling point further having means for transmitting the modified IAM to the SP where the monitored trunk terminates;

whereby the intelligent switched telephone network processes the call request thereafter as any ordinary call request to effect the telecommunications session.

* * * * *